(12) United States Patent
Kienzle et al.

(10) Patent No.: US 8,193,109 B2
(45) Date of Patent: Jun. 5, 2012

(54) CERAMIC MATERIALS CONTAINING SPHERICAL SHAPED CARBON PARTICLES

(75) Inventors: Andreas Kienzle, Balgheim (DE); Ingrid Kratschmer, Biberbach (DE)

(73) Assignee: Audi AG, Ingolstadt (DE)

( * ) Notice: Subject to any disclaimer, the term of this patent is extended or adjusted under 35 U.S.C. 154(b) by 17 days.

(21) Appl. No.: 11/808,183

(22) Filed: Jun. 7, 2007

(65) Prior Publication Data

US 2008/0125306 A1 May 29, 2008

(30) Foreign Application Priority Data

Jun. 8, 2006 (DE) .................. 10 2006 026 550

(51) Int. Cl.
*C04B 35/577* (2006.01)
*C04B 35/80* (2006.01)

(52) U.S. Cl. ........................................ 501/60
(58) Field of Classification Search .............. 501/90, 501/99, 95.2; 106/36; 188/251 R, 251 A
See application file for complete search history.

(56) References Cited

U.S. PATENT DOCUMENTS

| | | | | |
|---|---|---|---|---|
| 4,536,449 | A * | 8/1985 | Kennedy et al. | 428/408 |
| 5,486,496 | A * | 1/1996 | Talbert et al. | 501/90 |
| 5,543,368 | A * | 8/1996 | Talbert et al. | 501/90 |
| 5,656,213 | A * | 8/1997 | Sakaguchi et al. | 264/29.7 |
| 6,261,981 | B1 | 7/2001 | Dietrich et al. | |
| 6,716,800 | B2 * | 4/2004 | Demendi et al. | 508/107 |
| 6,774,073 | B2 * | 8/2004 | Wilkins | 501/90 |
| 6,824,862 | B2 * | 11/2004 | Bauer et al. | 428/293.4 |
| 6,936,341 | B2 | 8/2005 | Huener et al. | |
| 7,015,165 | B2 * | 3/2006 | Wilkins | 501/90 |
| 7,413,701 | B2 * | 8/2008 | Kienzle et al. | 264/658 |
| 2002/0084558 | A1 | 7/2002 | Hanzawa et al. | |
| 2002/0160902 | A1 * | 10/2002 | Lesniak et al. | 501/90 |
| 2004/0018935 | A1 * | 1/2004 | Wilkins | 501/90 |
| 2004/0127600 | A1 | 7/2004 | Bauer et al. | |
| 2005/0037915 | A1 * | 2/2005 | Wilkins | 501/90 |
| 2005/0040003 | A1 * | 2/2005 | Kienzle et al. | 192/107 M |
| 2007/0054063 | A1 | 3/2007 | Malischke | |
| 2007/0129233 | A1 * | 6/2007 | Ueno et al. | 501/99 |

FOREIGN PATENT DOCUMENTS

| | | |
|---|---|---|
| DE | 199 62 548 A1 | 7/2001 |
| DE | 100 09 229 A1 | 9/2001 |
| EP | 0 926 111 A2 | 6/1999 |
| JP | H03-177384 A | 8/1991 |
| JP | H06-11047 A | 1/1994 |
| JP | 09087029 * | 3/1997 |
| JP | 2002-338357 A | 11/2002 |
| JP | 2003-148630 A | 5/2003 |
| JP | 2003129199 * | 5/2003 |
| JP | 2005154258 * | 6/2005 |

OTHER PUBLICATIONS

Machine translation JP 2003148630, May 2003.*
Machine Translation of JP 2003148630, May 2003.*
European Search Report (Einschläischer Recherhnbericht) dated Jun. 1, 2007.
Krenkel et al., "C/C-SiC Composites for Space Applications and Advanced Friction Systems," Materials Science and Engineering A: Structural Materials: Properties, Microstructure & Processing, Lausanne, Ch, Bd. 412, Nr. 1-2, (Dec. 5, 2005), Part 177-188, XP005173795, ISSN: 0921-5093.
German Search Report (Recherchenbericht) dated Feb. 9, 2007.

* cited by examiner

*Primary Examiner* — Karl Group
(74) *Attorney, Agent, or Firm* — Novak Druce + Quigg LLP

(57) ABSTRACT

Ceramic materials with a matrix which contains at least one carbide, at least one carbide-forming element and carbon, and which furthermore contain a dispersed phase of carbon particles with spherical shape and an average diameter of 0.2 μm to 800 μm, a process for their production and their use for thermal insulation, as a protective layer in ceramic armoring against mechanical action, or as a friction layer in brake disks or clutch disks.

14 Claims, No Drawings

CERAMIC MATERIALS CONTAINING SPHERICAL SHAPED CARBON PARTICLES

CROSS-REFERENCE TO RELATED APPLICATIONS

This application claims priority from German Application No. 102006026550.5, filed Jun. 8, 2006, hereby incorporated by reference in its entirety.

The invention relates to ceramic materials containing spherical-shaped carbon particles.

Ceramic materials compared to metals are characterized among other things by high hardness, thermal stability and corrosion resistance. The lower strength and higher fracture sensitivity of ceramics can be compensated by reinforcing fibers contained in ceramic composites. The reinforcing fibers contained in the ceramic materials as dispersed phase act as crack branching and crack deflection sites; in this connection the mechanical stresses can be distributed over a larger volumetric element and can be reduced below the (local) fracture strength.

On the one hand, these fibers which preferably consist of carbon, with good binding to the matrix of the ceramic material, cause a major increase of the stiffness (modulus) and strength of the material, on the other hand these fibers can act as oxidation paths, since fibers of carbon at a high operating temperature are oxidatively damaged, and "burned" fibers can form channels along which oxygen can travel into the workpiece and thus can cause further damage.

Brake disks of ceramic composite materials compared to brake disks of metal for example are characterized by lower density, lower wear and higher deceleration performance.

The prior art (DE 100 48 012 A1) discloses such carbon-ceramic brake disks which have a multilayer structure of carrier bodies and friction layers, and in which the carrier body is reinforced with long carbon fibers (average length between 4 mm and 20 mm), and the friction layers have short carbon fibers (average length between 0.5 mm and 8 mm) as reinforcing means. Reinforcement of the material by carbon fibers is not however essential to the function of the friction layer; but the fiber content does affect the formation of crack structures and coefficients of thermal expansion. The more similar the composition of the friction layer to that of the carrier body, the fewer the problems in a so-called "thermal mismatch", that is, the different thermal expansion in the temperature range from the outside temperature ($-20°$ C. to $+40°$ C.) to the operating temperature.

The choice of short fibers as components of the material of the friction layer led to the best results to date with respect to this thermal expansion, but with the above addressed problems in oxidative and thermal long term stability.

It is therefore the object to at least partially replace carbon fibers as reinforcing means for ceramic materials in order to improve the oxidative and thermal stability of these materials.

It has been found that the carbon in spherical form can be used as the dispersed phase in ceramic materials, and the content of fibers can be reduced or reinforcing fibers can be completely dispensed with.

The invention therefore relates to ceramic materials with a matrix which contains at least one carbide, at least one carbide-forming element and carbon, and which furthermore contain a dispersed phase of carbon particles with spherical shape and an average diameter of 0.2 µm to 800 µm, preferably 0.5 µm to 500 µm, especially preferably 0.8 µm to 400 µm.

By preference silicon or a mixture containing it is chosen as the carbide forming element; the matrix then contains, optionally in a mixture with other carbides, silicon carbide.

The volumetric proportion of the dispersed carbon particles relative to the volume of the ceramic material is preferably 5% to 73%, especially preferably 10% to 65%, and especially 15% to 60%.

A particle is called spherical when in the smallest triaxial ellipsoids which can be circumscribed around the particle the semiaxes of this ellipsoid in their length do not differ by more than 20%, and the same criterion is met for the largest ellipsoids which can be inscribed within the particle; the centers of the ellipsoids are no more than 25% of the length of the largest semiaxis of the surrounding ellipsoid at a distance from one another, and the lengths of the corresponding semiaxes of the inner and outer ellipsoid differ by no more than 25% of the respective greater length.

The spherical-shaped carbon particles can be solid, or at least partially hollow or porous, and the cavities and the porosity can comprise a volumetric portion of up to 50% of the particle.

It has proven favorable to use spherical-shaped carbon particles with a bimodal size distribution, that is, a size distribution which contains a fraction with large and a fraction with small particles, the size of the small particles being selected such that they fit into the wedge formed between the large particles. Here it is preferred that particles with an average particle diameter of 100 µm to 150 µm be used as the large particles.

The ceramic materials according to the invention can furthermore also contain fibers, preferably carbon fibers and likewise preferably with a diameter from 4 µm to 12 µm and preferably a length from 0.1 mm to 48 mm, preferably 0.2 mm to 24 mm.

Suitable spherical-shaped carbon particles can be obtained by carbonization of spherical organic material such as polymerizate beads, artificial resin powders which are obtained by dry spraying, or also biogenic material such as for example dried sago. Bead polymerizates, especially of crosslinked polystyrene, which are used for example as ion exchangers and which contain the building blocks of functional comonomers with acid groups or ammonium groups, are especially preferred. These crosslinked polymers can be loaded by way of these functional groups with cations or anions, such as alkali or alkali earth metal cations, preferably Na, K, Mg, Ca and Sr, cations of aluminum, lead, titanium, zirconium, hafnium or rare earth metals such as yttrium or gadolinium; and anions are preferably phosphates, borates, aluminates, titanates, and silicates. With a suitable combination, glasses can be formed in these carbon spherules under process conditions of production of ceramic materials.

The ceramic materials according to the invention are produced by a mixture of spherical-shaped carbon particles and a binder being prepared, selected from artificial resins, pitches or mixture of them, and optionally carbon fibers. It is possible in this connection to use the binders in powder form or in liquid or viscous liquid form. Dry mixtures can be produced in a stirrer, liquid or pasty mixtures in a kneading machine. A dry mixture must be deaerated before or during shaping, for liquid or pasty mixtures it is already being deaerated during mixing. The molded body produced by compaction from this mixture should be essentially free of pores, should preferably have a porosity of at most 15%, measured as a volumetric proportion of pores in the molded body.

In other preferred embodiments, powdered silicon can also be added to the mixture, the mass proportion of the silicon powder in the mixture can be up to 15%, preferably up to 10%, and especially up to 8%. The powdered silicon preferably has a grain size (particle diameter) in the range from 50 µm to 2 mm.

Compaction into a molded body can be done preferably in a press.

The possibility also exists according to the invention of compacting the initial products of the carbon spherules into a preliminary body, in the case of polymerizate spherules for example by heating to the vicinity of the glass transition temperature. In the process a compacted bed forms with wedges by joining of touching particles in the vicinity of the contact site.

In addition, it is possible according to the invention of further adding powder of amorphous carbon in addition to the aforementioned mixture of spherical-shaped carbon particles, optionally carbon fibers, and a binder; the amorphous carbon powder is obtained for example by grinding of carbonized artificial resins such as phenolic resins or powdered pitches.

The described ceramic materials can be advantageously used for thermal insulation, as a protective layer in ceramic armoring against mechanical action, or as a friction layer in brake disks or clutch disks.

The invention will be described below by the following examples.

EXAMPLE 1

Production of amorphous spherical-shaped carbon 2 kg of an ion exchanger resin based on a sulfonated styrene divinyl benzene copolymer (®Lewatit K 1461, Bayer AG), 90% of the particles having a grain size of up to 620 µm, were heated in a nitrogen atmosphere with a heat-up rate of 1 K/min to a temperature of 900° C. After holding at the temperature for one hour the carbonized resin was cooled to room temperature. During pyrolysis a mass loss of 80% occurred, the particles shrunk during the process to an average particle size of 40 µm to approx. 50 µm.

EXAMPLE 2a

Production of a Press Body from Phenolic Resin and Spherical-Shaped Carbon 500 g of the spherical-shaped amorphous carbon from example 1 were premixed with 400 g of a dry phenolic resin powder (®Bakelite 223) in an intensive mixer from Eirich at 300/min$^{-1}$. Then, at an increased rpm of 1200/min$^{-1}$ within 5 minutes 300 ml of an aqueous solution of polyvinyl alcohol (mass concentration in the solution: 5 g in 100 g) were added. A lumpy mass called a "granulate" forms. It is dried in a drying cabinet to a residual moisture of approximately 2.5% (remaining mass proportion of water in the granulate).

EXAMPLE 2b

Production of a Press Body from Phenolic Resin, Carbon Powder and Spherical-Shaped Carbon 300 g of the spherical-shaped amorphous carbon from example 1 were premixed with 400 g of a dry phenolic resin powder (®Bakelite 227) and 300 g of an amorphous carbon powder with an average grain size of 100 µm to 120 µm, obtained by grinding and screening of a carbonized phenolic resin, in an intensive mixer from Eirich at 300/min$^{-1}$. Then, at an increased rpm of 1200/min$^{-1}$ within 5 minutes 250 ml of an aqueous solution of polyvinyl alcohol (mass concentration in the solution: 5 g in 100 g) were added. A lumpy mass called a "granulate" forms. It is dried in a drying cabinet to residual moisture of approx. 2.5% (remaining mass proportion of water in the granulate).

EXAMPLE 2c

Production of a Press Body from Phenolic Resin, Carbon Powder and Spherical-Shaped Carbon 240 g of the spherical-shaped amorphous carbon from example 1 were premixed with 400 g of a dry phenolic resin powder (®Bakelite 227), 120 grams of short carbon fibers with an average length from 0.5 mm to 1.0 mm, and 240 g of an amorphous carbon powder with an average grain size of 100 µm to 120 µm, obtained by grinding and screening of a carbonized phenolic resin in an intensive mixer from Eirich at 300/min$^{-1}$. Then, at an increased rpm of 1200/min$^{-1}$ within 5 minutes 250 ml of an aqueous solution of polyvinyl alcohol (mass concentration in the solution: 5 g in 100 g) were added. A lumpy mass called a "granulate" forms. It is dried in a drying cabinet to residual moisture of approx. 2.5% (remaining mass proportion of water in the granulate).

EXAMPLE 3a

Production of a Pressed Cylindrical Slab 350 g of the dried granulate from example 2a were placed in a cylindrical press mold with an outside diameter of 350 mm and a diameter of the inner cylinder of 180 mm to the same height, and pressed for ten minutes at a pressure of 170 MPa and a temperature of 150° C. After curing, a cylindrical annular disk with an outside diameter of 350 mm and an inside diameter of 180 mm, 3 mm thick, was obtained.

EXAMPLE 3b

Production of a Pressed Cylindrical Slab

Analogously to example 3a, pressed slabs were produced from the granulates of example 2b and 2c, with densities after pressing of 1370 kg/m$^3$ (2b) and 1460 kg/m$^3$ (2c). When this slab was siliconized alone, otherwise according to the process from example 5, the density was 2070 kg/m$^3$ (2b) and 2190 kg/m$^3$ (2c).

EXAMPLE 4

Production of a Carrier Body

Coated short graphite fibers were produced according to the description in patent application DE 197 10 105 A1. With these fibers a press body was prepared from 25 kg of a fraction of the indicated fibers with a length range from 1 mm to 2 mm, 6 kg of a fraction of the indicated fibers with a length range of up to 0.5 mm, and 4 kg of a fiber fraction with a length range from 0.5 mm to 1 mm, and 10 kg of a phenolic resin (®Norsophen 1203), this mixture having been homogenized in an intensive mixer from Eirich for eight minutes at an rpm of 500 min$^-$. 3.2 kg of the press body produced in this way were placed in a mold in the form of a cylindrical ring with an outside diameter of 360 mm and an inside diameter of 160 mm. Plastic cores with shape of the desired cooling channels were inserted into the mold during filling. In a hot flow press at a pressure of 2.5 N/mm$^2$ and a temperature of up to 180° C.

the mass was hardened into a green compact which was then carbonized at approx. 900° C. with the exclusion of oxidizing agents and with the formation of a porous, fiber-reinforced carbon body. The body experiences a mass loss of 12.5% relative to the charge mass. The body was machined to the desired final geometry.

EXAMPLE 5

Production of a Composite Disk from a Carbonized Carrier Body and Two Cylindrical Pressed Slabs According to Example 3

Two pressed slabs according to example 3 were heated in a furnace at a heating rate of 2 K/min under a protective gas (argon) to a temperature of 900° C., the cured phenolic resin proportions having been converted to amorphous carbon. These disks were fixed after cooling and removal from the furnace onto one respective cover surface each of a cylindrical carrier body according to Example 4 with a phenolic resin adhesive. By hardening in a press at 140° C. and a pressure of 100 MPa, a composite disk with a mass of 2200 g was produced. The disk was placed in a graphite crucible on three porous carbon wicks, the crucible was filled with 2800 g of a silicon granulate (grain size 0 mm to 2 mm) and heated in a vacuum furnace to a temperature of approx. 1700° C. at reduced pressure (approx. 5 mbar). The heat-up rates were 5 K/min to 1420° C., and 2 K/min up to 1700° C.; the silicon melts starting at 1420° C. and penetrates via pore channels into the composite body where it reacts with carbon to form SiC. After cooling, the C/SiC component formed is removed and optionally ground on the working surfaces.

The invention claimed is:

1. A ceramic material comprising a matrix comprising at least one carbide; the ceramic material further comprising a dispersed phase of carbon particles having a spherical shape, and wherein the carbon particles are present in the dispersed phase in a bimodal size distribution comprising large carbon particles and small carbon particles, wherein the large carbon particles have an average particle diameter of from 100 µm to 150 µm, and wherein the small particles fit into a wedge formed between adjacent large particles.

2. The ceramic material according to claim 1, wherein the matrix comprises silicon carbide.

3. The ceramic material according to claim 1, further comprising a dispersed phase of carbon fibers having a diameter from 4 µm to 12 µm and a length from 0.1 mm to 48 mm.

4. The ceramic material according to claim 1, wherein the volumetric proportion of the dispersed carbon particles is 5% to 73% of the volume of the ceramic materials.

5. The ceramic material according to claim 1, wherein the carbon particles have been obtained by carbonization of polymerizates which can be produced by bead polymerization.

6. The ceramic material according to claim 1, wherein the carbon particles have been obtained by carbonization of ion exchanger materials in spherical form.

7. The ceramic material according to claim 6, wherein the ion exchanger materials with cations are selected from the group of cations consisting of sodium, potassium, magnesium, calcium, strontium, aluminum, lead, titanium, zirconium, and hafnium, or with anions selected from borates, aluminates, silicates, titanates, and phosphates.

8. A thermal barrier insulator comprising the ceramic material according to claim 1.

9. The thermal insulator according to claim 8, wherein the insulator is in the form of a material selected from the group consisting of a protective layer in ceramic armoring against mechanical action, and as a friction layer in brake disks or clutch disks.

10. The ceramic material according to claim 1, further comprising powder of amorphous carbon.

11. The ceramic material according to claim 1, further comprising powdered silicon, in an amount of up to 15%.

12. The ceramic material according to claim 1, wherein the spherical-shaped carbon particles have a porosity of at most 50% by volume.

13. The ceramic material according to claim 1, wherein the spherical-shaped carbon particles are obtained by carbonization of organic material.

14. The ceramic material according to claim 1, obtained by a process comprising:
preparing a mixture containing a biomodal distribution of carbon particles with a spherical shape and a binder selected from artificial resins and pitches and optionally fibers of carbon with a diameter from 4 µm to 12 µm and a length from 0.1 mm to 48 mm;
compacting the mixture into an essentially pore-free body;
carbonizing the body by heating to a temperature from 750° C. to 1300° C. into a porous carbon body;
converting the porous carbon body with a carbide-forming element or a mixture of several carbide-forming elements at a temperature in the range of the melting point of the carbide-forming element or a mixture of these several carbide-forming elements to a temperature of 500 K above the indicated melting point, at least 10% of the mass of the carbon in the carbon body being reacted into carbide.

* * * * *